J. M. SKVOR & J. G. IRVING.
FISHING TACKLE.
APPLICATION FILED JAN. 23, 1912.

1,033,281.

Patented July 23, 1912.

Witnesses.
T. N. Bryant
M. E. Lowry

Inventors
John M. Skvor and
John G. Irving
By H. C. Evert
Attorneys

UNITED STATES PATENT OFFICE.

JOHN M. SKVOR AND JOHN G. IRVING, OF CEDAR RAPIDS, IOWA.

FISHING-TACKLE.

1,033,281.  Specification of Letters Patent.  Patented July 23, 1912.

Application filed January 23, 1912. Serial No. 672,940.

*To all whom it may concern:*

Be it known that we, JOHN M. SKVOR and JOHN G. IRVING, citizens of the United States, and residing at Cedar Rapids, in the county of Linn and State of Iowa, have invented certain new and useful Improvements in Fishing-Tackle, of which the following is a specification.

This invention relates to fishing tackle, and has particular relation to artificial bait of the type generally known in the art as "trolling" baits or spoons. Devices of this sort are used for trolling game fish, the theory being not that the fish takes the bait for something to eat, but rather that the object spinning through the water aggravates and annoys the fish so that it attacks it as a matter of fighting the object. On this theory, a spinner is used to attract the attention of the fish and colored devices forming a part of the bait annoy the fish and cause it to make the attack.

It is well known by fishermen that at certain seasons of the year, it is impossible to lure the fish into taking an artificial bait of one color or a combination of colors, but that by changing the colors or the combination, the fish will readily take the bait, and in view of this, it is the primary object of our invention to provide an artificial bait wherein the color or colors can be easily and quickly changed so as to provide a large number of combinations of colors as may be desired.

With the foregoing and other objects in view which will appear as the description proceeds, the invention resides in the combination and arrangement of parts and in the details of construction hereinafter described and claimed as a practical embodiment thereof.

Figure 1:
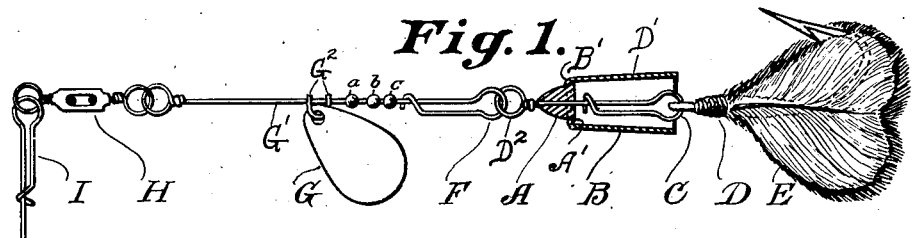
Figure 2:
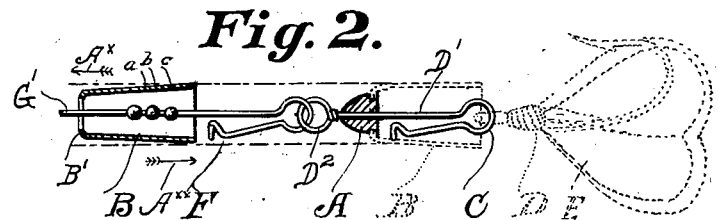
Figure 3:
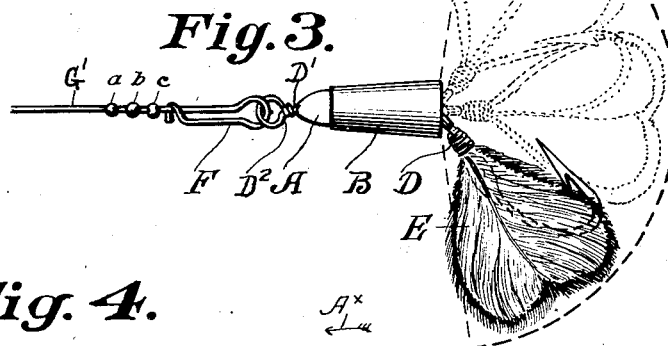
Figure 4:
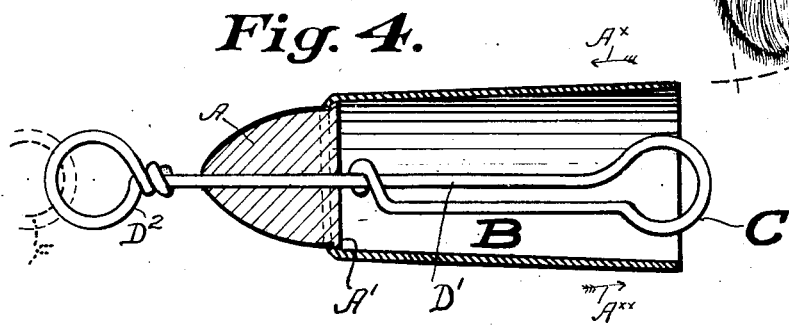

In the accompanying drawings, forming a part of this specification: Figure 1 is an elevation of a trolling bait in accordance with our invention. Fig. 2 is a sectional detail showing in full and dotted lines the manner of removing the sleeve from the troll. Fig. 3 is a view in elevation of our improvement showing a plurality of feathered hooks attached, one of said hooks being in full and the remainder in dotted lines, and, Fig. 4 is an enlarged sectional view of our improvement detached.

In trolling baits of this character, it is usual to provide hooks as E, of the ordinary form, or sometimes a plurality of these hooks are bound together and commonly known as "gangs," or a plurality of independent hooks may be employed, and to the shanks of the hooks is fixedly attached feathers or other fuzzy material which has been colored in a variety of shades or colors, such feathers or other colored material being securely bound to the shanks of the hooks near the eyes of the latter as by wrapping D. In order to provide for the ready attachment and detachment of these hooks, it is the usual practice to provide a stem as $D'$ usually formed from a single piece of wire having at one end a loop or eye $D^2$ and its other end bent to form a spring loop C which detachably receives the connecting eye of the artificial bait E.

Our invention resides in mounting on the stem $D'$ a conical member A usually made of metal, but which may be formed of any desired material, and in also providing a frusto-conical sleeve B which telescopes the member A, and is made in various colors or in any combination of colors as may be desired. The sleeve B is limited in its rearward movement, and held when in use in the desired position by providing the conical member A at its large or rear end with an annular flange $A'$ which is engaged by an inturned flange $B'$ at the smaller end of the sleeve B. It is the practice in trolling baits of this character to provide a swivel as H connected at one end to a spinner carrying member $G'$ which has a spring loop F for connecting with the eye $D^2$ and which has a suitable spinner or spoon G. The spinner or spoon is mounted on the member so as to have a free whirling movement thereon as the troll is drawn through the water, as by a loop $G^2$, rotatable bearings as $a$, $b$, $c$, being also usually provided. The swivel has the eye at the other end thereof connected to the spring loop of a line or leader attaching member I.

By providing a series of differently colored hooks, and a series of differently colored sleeves B, it will be obvious that a range of combination of colors may be obtained, as the stem $D'$ may be readily disconnected from the bait stem $D'$, a differently colored sleeve B placed on the stem $D'$, and a differently colored hook also placed on the stem $D'$ until the combination desired has been obtained. Thus by changing the sleeves and hooks, and arranging new combinations, an infinite variety may be obtained. To remove sleeve B, the same is moved in a direction indicated by arrows, A$^x$, Figs. 2 and 4, stem D' disconnected from loop F and sleeve removed. Arrows A$^{xx}$ indicate movement of sleeve to its position for use shown in full lines, Figs. 1, 3 and 4 and in dotted lines, Fig. 2.

The sleeve B is adapted to drop down over the spring loop C to such an extent that when the hook is placed in use in fishing, it can only flex a limited distance from a straight line, thus holding the hook in such a direction that when the fish strikes, as it does following the troll, assurance of the hook entering the mouth of the fish is had, and danger of the hook flexing so as to become entangled in the remainder of the tackle is prevented.

As the bait is drawn through the water, the conical member A and sleeve B form a cone-shaped cup which serves to divide the water and spread it in all directions and to leave a vacuum in the wake of the sleeve, and the water rushing in to fill this vacuum gives a desired agitation to the feathered hook or hooks to increase the effectiveness of the lure.

Having fully described our invention, what we claim as new and desire to secure by Letters Patent is:

A troll comprising a bait stem formed at one end with an eye and at the other end with a spring loop, a conical member revolubly mounted on the stem between said eye and loop, a sleeve telescoping said conical member and the loop end of the troll, the sleeve being removable over the smaller end of the conical member, and means on the larger end of said member and the smaller end of the sleeve limiting the movement of the sleeve in one direction.

In testimony whereof we affix our signatures in presence of two witnesses.

JOHN M. SKVOR.
JOHN G. IRVING.

Witnesses:
JOHN BUNIANEK, Jr.,
JOHN M. ELY.